July 17, 1923.
W. A. MARTIN
DIVIDING BOARD REGULATOR
Filed Dec. 2, 1921
1,462,017
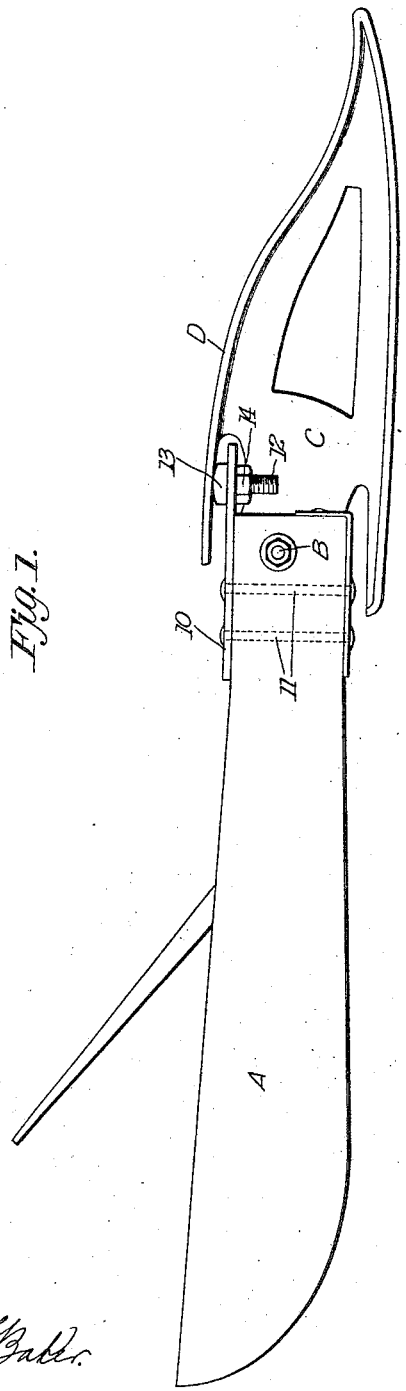
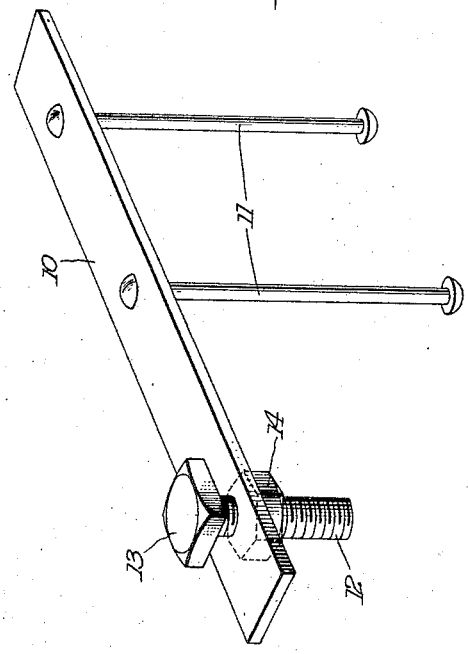
W. A. Martin
INVENTOR
BY Victor J. Evans
ATTORNEY
WITNESS:

Patented July 17, 1923.

1,462,017

UNITED STATES PATENT OFFICE.

WILLIAM A. MARTIN, OF WELLINGTON, COLORADO.

DIVIDING-BOARD REGULATOR.

Application filed December 2, 1921. Serial No. 519,482.

*To all whom it may concern:*

Be it known that I, WILLIAM A. MARTIN, a citizen of the United States, residing at Wellington, in the county of Larimer and State of Colorado, have invented new and useful Improvements in Dividing-Board Regulators, and of which the following is a specification.

This invention relates to mowing machines, particularly to attachments for the dividing boards thereof, and has for its object the provision of means whereby the division board may be adjusted to any desired position whereby a free path may be cleared for following swaths even though the crop to be mowed may be badly tangled or fallen down alfalfa or the like.

An important object is the provision of adjusting means of this character which will prevent the board from sagging when backing or turning and which will allow the board to be elevated clear when backing in thick, heavy and tangled hay so as to prevent damage to the board.

Another object is the provision of a device of this character which may be manufactured and sold as a separate entity adapted to be secured upon already existing mowing machines without necessitating any alterations in the construction thereof.

An additional object is the provision of a device of this character which will be simple and inexpensive in manufacture, easy to apply, efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of a division board showing my device applied thereto.

Figure 2 is a perspective view of my device detached.

Referring more particularly to the drawings, the letter A designates a division board or grass board which is attached, as shown at B, to the outer shoe C or the cutter bar, this outer shoe having a rolled edge D.

In carrying out my invention I provide a regulating device which comprises an elongated plate 10 disposed upon the upper edge of the grass board and secured thereto by means of a pair of bolts 11. The forward end of the plate 10 projects beyond the forward edge of the grass board and is provided with a threaded hole through which is screwed a bolt 12 having a rather flat head 13 engaging the underside of the rolled edge D of the outer shoe, and this bolt carries a lock nut 14 whereby it may be held at any desired adjusted position.

Assuming that my device is constructed and mounted as above described and as illustrated in the drawings, it will be seen that by adjusting the bolt 12 the position of the grass board A with respect to the outer shoe C may be readily varied so that the grass board may be tilted to any desired angle and held in such position or so that it may be elevated comparatively high so as to clear the ground when backing in heavy hay or when operating in a downfallen heavy crop of alfalfa or the like.

In this way it will be seen that my device will amply prevent the grass board from being injured or strained, my device consequently being of great advantage. Owing to the extreme simplicity of the construction, it will be apparent that any necessary or desired adjustment may be made with the utmost ease and in the minimum length of time, the structure being furthermore so simple that there is nothing to get out of order so that the device should consequently have an extremely long life and efficiently perform all the functions for which it is intended.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. The combination with the division board and outer shoe of a mowing machine, of an adjusting device comprising a plate secured upon the division board and projecting beyond the forward end thereof, and an adjustable element carried by the projecting end of the plate and engaging beneath a projection on the shoe for effecting desired adjustment.

2. The combination with the division board and outer shoe of a mowing machine, an adjusting device comprising an elongated plate secured upon the division board and projecting beyond the forward end thereof and a screw member carried by the projecting end of the plate and engaging against a projection on the shoe for effecting desired adjustment.

3. The combination with the division board and outer shoe of a mowing machine, of an adjusting device comprising a plate secured upon the division board and projecting beyond the forward end thereof, a bolt threaded through said plate and engaging beneath a projection on the shoe, and a lock nut on said bolt for maintaining the desired adjustment.

In testimony whereof I affix my signature.

WILLIAM A. MARTIN.